United States Patent [19]

Korhonen

[11] 4,275,479
[45] Jun. 30, 1981

[54] DEVICE FOR HANDLING OF MEAT AND CUTTING-UP THEREOF

[76] Inventor: Kaarlo J. Korhonen, Säterivägen 18, S 161 70 Bromma, Sweden

[21] Appl. No.: 51,236

[22] Filed: Jun. 22, 1979

[30] Foreign Application Priority Data

Jun. 22, 1978 [SE] Sweden ............................. 7807190

[51] Int. Cl.[3] ............................................. A22B 5/00
[52] U.S. Cl. .................................... 17/1 R; 294/19 R
[58] Field of Search ......................... 17/1 R; 294/19R

[56] References Cited

U.S. PATENT DOCUMENTS

| 2,941,367 | 6/1960 | Schwab | 294/19 R X |
|---|---|---|---|
| 3,117,555 | 1/1964 | Hayden | 294/19 R X |
| 3,669,487 | 6/1972 | Roberts et al. | 294/19 R X |
| 3,885,824 | 5/1975 | Hulst | 294/19 R |

*Primary Examiner*—Willie G. Abercrombie

*Attorney, Agent, or Firm*—Burns, Doane, Swecker & Mathis

[57] ABSTRACT

A device for handling meat comprises a handle (1) which is provided with a claw (3, 4) that comprises a shaft (3) with a die (4). The claw is replaceably mounted at the handle (1). The die (4) may be fork shaped and provided with a sharpened edge. The handle comprises a power cylinder (8, 9) which drives a punch (6) toward the die (4) for clamping a meat piece between the punch (6) and the die (4). The handle (1) may be pivotably mounted on a support arm (22). The support arm (22) is preferably vertically length adjustable. The arm (22) is mounted on a horizontal beam (25). The beam (25) is connected to a power cylinder (27) which is arranged to displace beam (25) and thereby arm (22) and handle (1), in a horizontal direction. The punch drive, the length adjustment of support arm (22) and drive of cylinder (27) can be controlled by the operator, e.g. by means of valve sets (30, 31) arranged on the handle (1).

10 Claims, 7 Drawing Figures

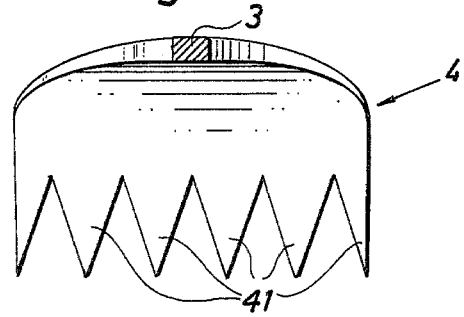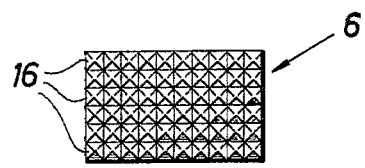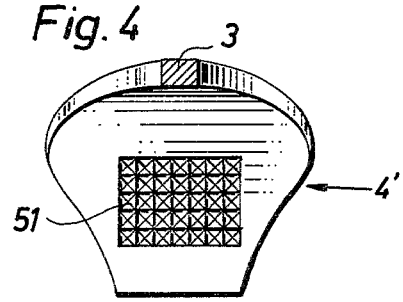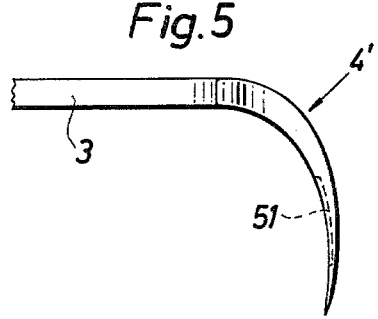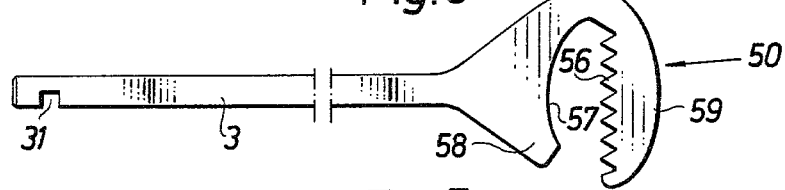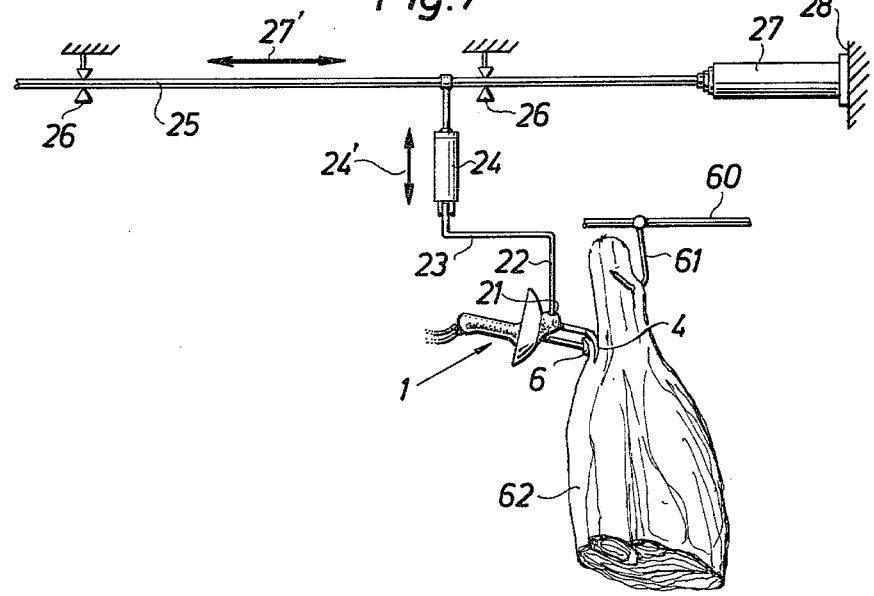

DEVICE FOR HANDLING OF MEAT AND CUTTING-UP THEREOF

The invention concerns a device for handling of meat at cutting-up thereof, especially at cutting loose meat from carcass parts.

BACKGROUND

At larger slaughter houses, the cutting-up of carcasses is performed at different stations. At some stations the carcass or part thereof is supported hanging from the ceiling and the butcher works with a knife only. During cutting-up operations, especially when cutting-up heavy carcass parts such as legs, the butcher must pull away the meat piece he is cutting loose with his knife, from the carcass part by means of his free hand, in order to get access to the cut location with his knife. As the meat piece which is cut loose, may have a substantial weight, the butcher must also be prepared to support the weight thereof in order to avoid that it is torn loose from the carcass part at the end of the operation, resulting in meat damages for example. Thus, when the butcher is cutting loose rump steak pieces and thick flanks from a leg, he must exert substantial power with his free hand and arm in order to avoid meat damages. When the butcher is cutting through pelvis bone joints and removing a rib, he must hold his free hand close to the cut in order to separate the members during the cutting operation. As the environment of the slaughter house as well as the meat often has fairly low temperature, and the meat is slippery, it is appreciated that the butcher too often runs the risk of cutting himself, and that the slaughters work often is unacceptably heavy. Also at fine cutting-up of coarse-cut bone free meat pieces, the slaughther normally works with a knife only, the meat pieces being held by means of his one hand, and also in this case there is too big a risk for cutting himself.

PRIOR ART

At coarse cutting-up, i.e. cutting loose meat from a carcass part, it is known per se to utilize aids in the shape of handle provided with a meat hook. However, such meat hooks have not come to any substantial use, as they easily tear the meat along the meat fibres, because the carcass or part thereof being treated normally hangs vertically and the meat fibres then generally running in the vertical direction. As the butcher cuts up the meat by means of substantially vertical cuts, the meat hook must thus be attached in the meat piece at a meat fibre end.

OBJECT OF THE INVENTION

An object of the invention is to provide a device which simplifies for the butcher to hold the meat piece during the cutting-up operation without damages to the meat piece, and which simultaneously provides a finger and hand guard. A further object is to provide a device of the above kind, which relieves the butcher of the heavy and power wasting work of pulling away and supporting the meat piece being cut loose, during the cutting-up operation, whereby the butcher indirectly is prevented from cutting-damages and back-damages.

CHARACTERIZATION OF THE INVENTION

The inventive device for handling of meat at cutting-up thereof, especially cutting loose meat from carcass parts such as legs, comprises a handle with means for holding a meat piece and is distinguished substantially in that the means comprises a claw including a shaft mounted at the handle and a die connected to the shaft, a punch which is arranged moveable toward and away from the die and which is designed for surface area extended cooperation with the die, and a controllable means for driving the punch toward and away from the die. Especially the cooperating surfaces of the die and the punch may be arranged substantially in a normal plane to the direction of the substantially straight shaft, the punch being arranged moveable back and forth between the handle and the die. The drive means may consist of a hydraulic or pneumatic cylinder, the piston of which is connected to the punch for driving same back and forth. A valve may be arranged to control the cylinder fluid, and the valve can be arranged controllable by means of a finger on the hand by means of which the operator or butcher is holding the handle of the device. Preferably the valve is designed in such a way that the cylinder with a constant power drives the punch toward the die when the valve is subjected to a first actuation, and such that the punch is withdrawn from the die toward the handle when the valve is subjected to a second actuation.

The die may especially be designed as a fork. The free edge of the die can be designed as a knife edge, whereby the die can be stricken into the carcass part from which the butcher shall cut loose a meat piece, without the requirement of a preceding incisioning in order to make place for the die.

The claw can be replaceably mounted at the handle, a channel being arranged in the handle for the shaft of the claw. Moreover, a spring loaded latch which is controllable from the handle may be arranged to grip into a notch in the shaft end when the shaft is inserted in the channel.

The handle may be supported in a preferably vertically length adjustable support arm, which is connected to a support, point, for example the ceiling of the slaughter house station. The connection between the support arm and the handle may be designed as a ball joint or a universal joint, permitting rotation of the handle around the axis of the support arm and permits pivoting of the handle, preferably at least 45°, relative to the axis of the support arm.

The support arm may be arranged to cooperate with a drive means for driving the support arm in at least one substantially horizontal direction.

The support arm may be length adjustable by comprising a controllable and lockable hydraulic cylinder whereby the device can maintain a meat piece clamped between the punch and the die in the desired vertical position without any substantial power exertion by the operator.

When a meat piece clamped between the punch and the die is cut loose from the carcass part, it may be desirable to horizontally pull away the meat piece being cut away, from the carcass part, such that the butcher more easily gets access to work with his knife. Thanks to the horizontal drive means which is connected to the support arm, this horizontal pulling away of the meat piece from the carcass part can be obtained without any substantial work of the butcher. The horizontal drive means may consist of a hydraulic cylinder which is controllable or manipulatable by the butcher and which horizontally displaces a substantially horizontal shaft to which the support arm is connected. Said horizontal shaft is supported in displacement journals.

It should, however, be noted that the inventive device is useful and satisfies the inventive object even if it is not connected to a support system of the above type. Moreoover, it should be noted that several different claw shaped tools may be utilized together with the inventive device. The different claw shaped tools are then each adapted to specific cutting-up operations. Furthermore, it should be noted that such claw shaped tools do not necessarily require assistance by the punch in order to function properly. One such claw shaped tool may comprise a shaft which is connectable to the handle in the way indicated above, and a substantially U-shaped element connected to the shaft. The U-shaped element can then from the side be threaded over a rib in a carcass side, and in this case the above described horizontal drive means can be actuated such that the rib is pulled out of the carcass side without any substantial manual power exerted by the butcher. The U-leg remote from the shaft can be designed toothed in order to provide a grip against one side of the rib whereby the rib is safely clamped between the legs of the U-shaped element when the element is slanted relative to the rib.

The invention is defined in the appended claims.

In the drawings:

FIG. 2 shows an end view of the exchangeable claw illustrated in FIG. 1.

FIG. 3 shows an end view of the punch illustrated in FIG. 1.

FIGS. 4 and 5 show views corresponding to those of FIGS. 2 and 3, of an alternative claw for the device.

FIG. 6 shows a tool for pulling out ribs.

FIG. 7 shows the device according to FIG. 1 as supported and applied at a cutting-up station.

EMBODIMENTS

Figure 1:
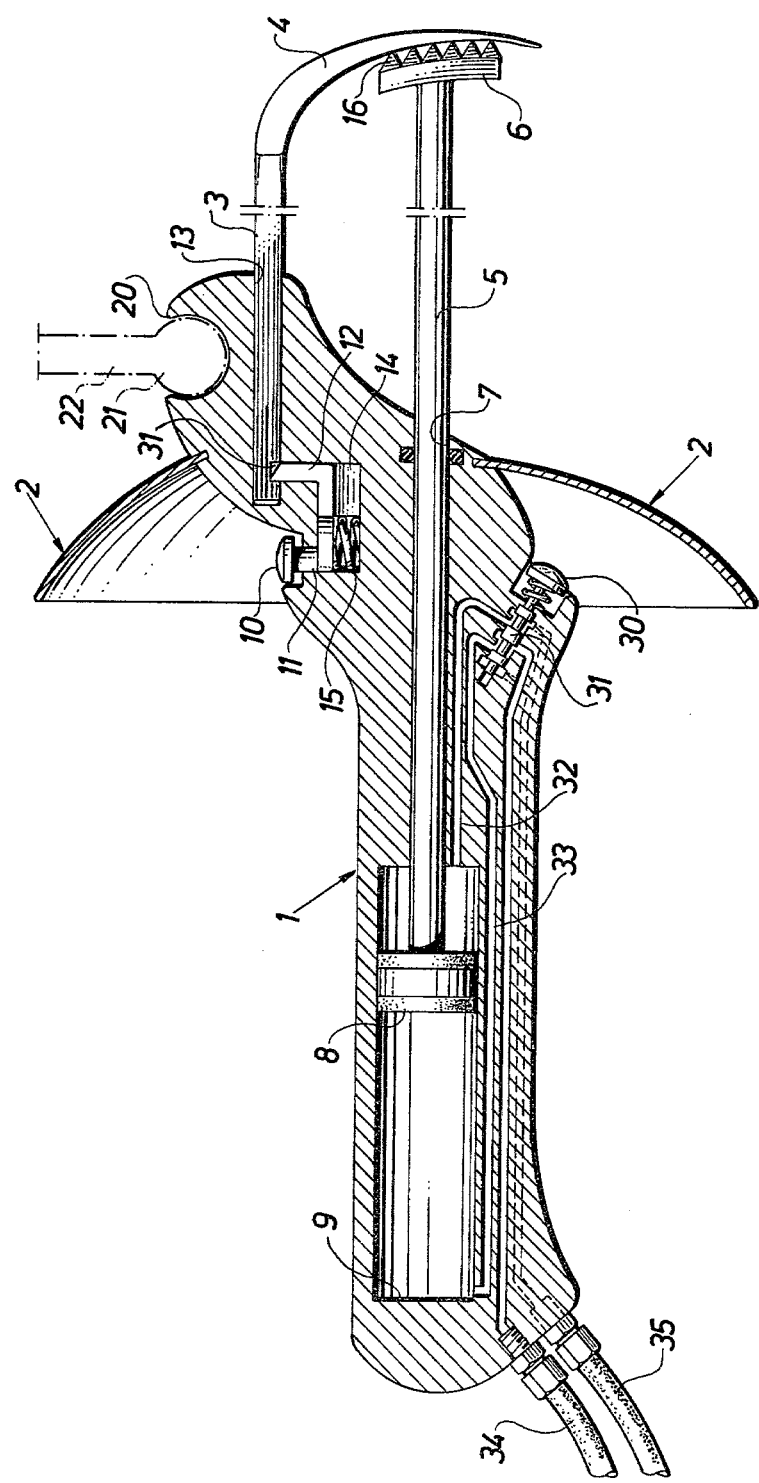
FIG. 1 shows schematically an axial section to an inventive device.

FIG. 1 shows a tool device for handling of meat at cutting-up thereof. The device comprises a handle 1 with a guard plate 2. The guard plate 2 is made stiff as it may function as support for the meat being handled during operation of the device. Preferably the guard plate is designed as part of a spherical shell. In the forward end of handle 1 there is a channel 13 which receives a shaft 3 carrying a die 4 the design of which is closer shown in the end view according to FIG. 2. The shaft 3 has a notch 31 cooperating with a latch 12, which is arranged vertically moveable in a recess 14 in the handle. A spring 15 is arranged between the latch 12 and the bottom of the recess 14. The latch is controllable by means of a button 10, which by means of a connection element 11 is connected to the latch 12. The button 10 is recessed in the handle in order to prevent unintentional operation thereof.

A hydraulic cylinder 9 is arranged in the gripping portion of the handle 1. The cylinder 9 comprises a piston 8. A punch shaft 5 extends through a channel 7 in the handle and is connected to the piston 8. The punch shaft carries at its free end a punch 6, the surface of which facing the die 4 being generally adapted to the curvature of the die 4. The active surface of punch 6 is closer illustrated in FIG. 3.

A hydraulic valve 31 is arranged in the lower portion of handle 1 and is controllable by means of a manually actuatable button 30, which may be arranged in correspondence with button 10. An in-let line 34 and an out-let line 35, respectively, for the hydraulic fluid are connected to valve 31, and hydraulic lines 32 and 33 extend from valve 31 to the cylinder compartments separated by the piston 8. Valve 31 is designed in such a way that the piston 8 is driven with constant power to the right in FIG. 1 when button 30 is subjected to a first actuation, and such that the piston 8 is driven to the left in FIG. 1 when button 30 is subjected to next actuation.

In the upper forward portion of the handle there is a spherical socket 20. A ball 21 is fitted in the socket 20, and a support arm 22 is mounted at the ball 21. The ball joint 20, 21 permits rotation of the handle 10 around the axis of arm 22 and permits a pivoting motion for the handle 1 relative to the axis of arm 22, within 90°.

As appears from FIG. 2 the shaft is designed out of round and the channel 13 has a corresponding shape such that the shaft 3 and the die 4 are held fixed against rotation relative to the handle. The die 4 is preferably designed with a plurality of fingers or forkpins 41, and at least the tops of these pins 41 may be designed as knife edges.

Referring to FIG. 3, the punch 6 is preferably provided with teeth, pyramids or cones 16 in order to prevent a meat piece from slipping away from the clamping grip between die 4 and punch 6.

FIGS. 4 and 5 show an alternative claw to replace the claw revealed in FIGS. 1 and 2. The claw die 4' is designed as a single flat finger, the top of which is sharpened. A surface area 51 on the die 4' is aligned with the punch 6. In the area 51 a plurality of protrusions are arranged, which provide a steady grip on a meat piece. The protrusions in area 51 are preferably recessed so that the tops thereof lie in or under the general surface plane of die 4'. Hereby the protrusions in area 51 do not impede insertion of the die 4', in a piece to be cut-off.

When the device is to be utilized for pulling out ribs out of a carcass side, for example, the tool according to FIG. 6 can be utilized. The tool according to FIG. 6 comprises a shaft 3 with a notch 31 so that the tool can be fitted in the handle according to FIG. 1. The shaft 3 is provided with a yoke 50. The yoke 50 has generally U-shape and comprises two legs 58, 59 extending substantially perpendicularly to the shaft. The leg 59 is provided with teeth 56 providing a good grip, while the leg 58 is curved as indicated at 57 in order to conform to the cross-section shape of a rib. A tilting of tool 50 relative to the rib brings about that the rib is gripped in the yoke 50, whereafter the rib can be pulled out by means of the power system described below.

In FIG. 7 the device according to FIG. 1 is shown as applied in a slaughter house station. An over head mounted beam 60 carries a meat hook 61 on which a carcass part 62, for example a leg, is supported. The handle 1 is by means of joint 21 pivotably connected to the substantially vertically orientated support arm 22, which via a rigidly connected arm member 23 is mounted at a hydraulic cylinder 24, which is length adjustable in a vertical direction as illustrated by arrow 24'. The support arm 22, 23 is connected to a horizontal beam 25. Beam 25 is displaceably mounted in over head bearings 26 for displacement in the direction of arrow 27'. Beam 25 is driveable in the horizontal direction by means of a cylinder 27 which is supported against a fixed point 28.

Cylinder 27 and cylinder 24 are arranged controllable by the butcher, and the control means for cylinders 24 and 27, respectively, can in a manner known per se, be arranged on handle 1.

If so desired, the butcher can before he applies the device 1, make a cut in the upper left portion of the carcass part 62 in order to permit insertion of die 4 in the cut (with the punch 6 withdrawn).

Alternatively the butcher can without preceding cutting of the carcass part 62 directly drive the die 4 into the meat, if the free edge of the die is designed as a knife edge.

Then, when the butcher actuates button 30, the punch 6 will clamp the meat piece between the die 4 and the punch 6. Then the butcher can control the cylinder 27 such that cylinder 27 pulls away handle 1, whereby the handle 1 and thereby the clamped meat piece, are pulled away from the carcass part 62. The butcher has now free access to cut loose the clamped meat piece from the carcass part 62 by means of a knife and with substantially vertical cuts. If so desired, the cylinder 27 can be designed in such a way that it exhibits a constant pull in the beam 25 in order to provide a continuous pulling of the meat piece.

Preferably the hook 61 and the carcass part 62 is rigidly held by means of a robot arm of the type revealed in Swedish published patent application No. 77-02020-3.

What is claimed is:

1. A device for handling of meat at cutting-up thereof, especially cutting loose meat from a carcass part, comprising:
a handle;
said handle having means for selectively gripping a piece of meat, said means comprising:
 a claw member, said claw member having:
  a shaft, said shaft being mounted on said handle;
  a die, said die being included on an end of said shaft; and
  a die surface, said die surface being included on said die;
 a punch member, said punch member being accommodated by said handle such that said punch member is selectively linearly movable toward and away from said die;
 means for selectively driving said punch member toward and away from said die; and
 a punch surface included on said punch member, said punch surface cooperating with said die surface when said punch member is moved toward said die such that said piece of meat is gripped between said punch surface and said die surface;
 wherein said die surface and said punch surface are each arranged substantially in planes normal to the direction of movement of said punch member.

2. The device according to claim 1 further comprising a plurality of finger members, said finger members being included on said die.

3. The device according to claim 1 wherein said die includes a free edge portion, said free edge portion having a knife edge.

4. The device according to claim 1 wherein said claw member is replaceably mounted on said handle.

5. The device according to claim 1 further comprising:
a support arm, said support arm having a vertical length which is selectively adjustable; and
joint means for connecting said support arm to said handle.

6. The device according to claim 5 further comprising horizontal drive means connected to said support arm for driving said support arm in a substantially horizontal direction.

7. A device for handling of meat at cutting-up thereof, comprising:
a horizontal beam member;
means for selectively driving said horizontal beam member in a substantially horizontal direction;
a support member, said support member being connected to said horizontal beam member and having a vertical length which is selectively adjustable; and
a handle member, said handle member being rotatably and pivotably connected to said support member and having means for selectively gripping a piece of meat, said means comprising:
 a punch member accommodated by said handle member such that said punch member is selectively movable relative to said handle member, said punch member having a punch surface disposed substantially perpendicular to the direction of movement of said punch member;
 a claw member mounted on said handle member and having a die surface disposed substantially perpendicular to the direction of movement of said punch member; and
 power drive means for selectively moving said punch member toward and away from said claw member such that said punch surface is selectively moved toward and away from said die surface,
 said punch surface cooperating with said die surface when said punch member is selectively moved toward said claw member such that said piece of meat is gripped between said punch surface and said die surface.

8. The device according to claim 7:
wherein said handle member includes a channel;
wherein said punch member includes:
 a punch shaft, said punch shaft being accommodated in said channel; and
 a punch element, said punch element being attached to said punch shaft and said punch element having said punch surface;
wherein said power drive means comprises:
 a cylinder, said cylinder being included in said handle member;
 a piston, said piston being accommodated in said cylinder and being connected to said punch shaft; and
 control means for selectively causing said piston to move within said cylinder.

9. The device according to claim 8 wherein said cylinder is a pneumatic cylinder.

10. The device according to claim 8 wherein said cylinder is a hydraulic cylinder.

* * * * *